United States Patent
Wang et al.

(10) Patent No.: US 10,834,664 B2
(45) Date of Patent: *Nov. 10, 2020

(54) FACILITATING AN ENHANCED TWO-STAGE DOWNLINK CONTROL CHANNEL IN A WIRELESS COMMUNICATION SYSTEM

(71) Applicant: AT&T Intellectual Property I, L.P., Atlanta, GA (US)

(72) Inventors: Xiaoyi Wang, Austin, TX (US); Sairamesh Nammi, Austin, TX (US); Thomas Novlan, Cedar Park, TX (US); Salam Akoum, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,101

(22) Filed: May 1, 2019

(65) Prior Publication Data

US 2019/0261256 A1 Aug. 22, 2019

Related U.S. Application Data

(63) Continuation of application No. 15/400,726, filed on Jan. 6, 2017, now Pat. No. 10,321,386.

(51) Int. Cl.
*H04W 48/12* (2009.01)
*H04L 5/00* (2006.01)

(52) U.S. Cl.
CPC ............ *H04W 48/12* (2013.01); *H04L 5/0053* (2013.01); *Y02D 70/00* (2018.01); *Y02D 70/1224* (2018.01);
(Continued)

(58) Field of Classification Search
CPC ... H04W 48/12; H04L 5/0053; Y02D 70/162; Y02D 70/146; Y02D 70/1264;
(Continued)

(56) References Cited

U.S. PATENT DOCUMENTS

| 7,835,320 B2 | 11/2010 | Magnusson et al. |
| 8,570,959 B2 | 10/2013 | Ishii |

(Continued)

FOREIGN PATENT DOCUMENTS

| WO | 2011131014 A1 | 10/2011 |
| WO | 2011162131 A1 | 12/2011 |

(Continued)

OTHER PUBLICATIONS

Lee et al., "Recent Advances in Radio Resource Management for Heterogeneous LTE/LTE-A Networks," IEEE Communications Surveys & Tutorials, 2014, pp. 2142-2180, vol. 16, No. 4, 39 pages.

(Continued)

*Primary Examiner* — Faisal Choudhury
(74) *Attorney, Agent, or Firm* — Amin, Turocy & Watson, LLP

(57) ABSTRACT

A two-stage enhanced downlink control channel (DCI) is provided. In one example, a method comprises performing processing to attempt to decode a second stage of DCI without blind decoding and based on resource allocation information (RAI), wherein the decoding the first stage of DCI comprises blind decoding and wherein the second stage of DCI and uplink control information is received after the first stage of DCI. The method also comprises based on successfully decoding the second stage of DCI, decoding a physical data shared channel (PDSCH). In various embodiments in which semi-persistent scheduling is provided, decoding information previously received in a prior trans- (Continued)

mission time interval can be employed in a current or subsequent TTI to conserve bandwidth and power.

20 Claims, 10 Drawing Sheets

(52) U.S. Cl.
CPC ...... *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01)

(58) Field of Classification Search
CPC ............. Y02D 70/144; Y02D 70/1224; Y02D 70/1262; Y02D 70/1242; Y02D 70/142; Y02D 70/00
USPC ........................................................ 370/329
See application file for complete search history.

(56) References Cited

U.S. PATENT DOCUMENTS

| | | | |
|---|---|---|---|
| 8,780,850 | B2 | 7/2014 | Kishiyama et al. |
| 8,913,529 | B2 | 12/2014 | Walton et al. |
| 9,497,741 | B2 | 11/2016 | Park et al. |
| 2010/0331030 | A1* | 12/2010 | Nory ...................... H04L 5/0053 455/509 |
| 2011/0194412 | A1 | 8/2011 | Park et al. |
| 2011/0299489 | A1* | 12/2011 | Kim ...................... H04L 1/0061 370/329 |
| 2013/0039291 | A1 | 2/2013 | Blankenship et al. |
| 2013/0070703 | A1 | 3/2013 | Yasukawa et al. |
| 2013/0336198 | A1 | 12/2013 | Kim et al. |
| 2013/0336255 | A1 | 12/2013 | Gupta et al. |
| 2014/0198748 | A1 | 7/2014 | Lee et al. |
| 2015/0003352 | A1* | 1/2015 | Seo ........................ H04B 7/08 370/329 |
| 2015/0078273 | A1* | 3/2015 | Aiba ...................... H04L 1/0072 370/329 |
| 2015/0326373 | A1 | 11/2015 | Ryu et al. |
| 2015/0341858 | A1* | 11/2015 | Hwang .................. H04L 1/1854 370/311 |
| 2016/0128028 | A1 | 5/2016 | Mallik et al. |
| 2016/0212734 | A1 | 7/2016 | He et al. |
| 2016/0262119 | A1 | 9/2016 | Kim et al. |
| 2016/0286546 | A1 | 9/2016 | Koyanagi et al. |
| 2016/0302183 | A1 | 10/2016 | Yang et al. |
| 2016/0337086 | A1 | 11/2016 | Shen et al. |

FOREIGN PATENT DOCUMENTS

| | | |
|---|---|---|
| WO | 2013141114 A1 | 9/2013 |
| WO | 2015039410 A1 | 3/2015 |
| WO | 2016171765 A1 | 10/2016 |
| WO | 2016186699 A1 | 11/2016 |

OTHER PUBLICATIONS

Ahmed et al., "Reducing Scanning Latency in WiMAX Enabled VANETs," Proceedings of the 2014 Conference on Research in Adaptive and Convergent Systems, 2014, ACM, 5 pages.

Office Action dated May 10, 2018 for U.S. Appl. No. 15/400,726, 29 pages.

Office Action dated Sep. 20, 2018 for U.S. Appl. No. 15/400,726, 13 pages.

* cited by examiner

FACILITATING AN ENHANCED TWO-STAGE DOWNLINK CONTROL CHANNEL IN A WIRELESS COMMUNICATION SYSTEM

RELATED APPLICATION

The subject patent application is a continuation of, and claims priority to, U.S. patent application Ser. No. 15/400,726 (now U.S. Pat. No. 10,321,386), filed Jan. 6, 2017 and entitled "FACILITATING AN ENHANCED TWO-STAGE DOWNLINK CONTROL CHANNEL IN A WIRELESS COMMUNICATION SYSTEM," the entirety of which application is hereby incorporated by reference herein.

TECHNICAL FIELD

The subject disclosure relates generally to communications systems, and, for example, to systems, methods and/or machine-readable storage media for facilitating an enhanced two-stage downlink control channel for a wireless communication system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

DETAILED DESCRIPTION

Figure 1:
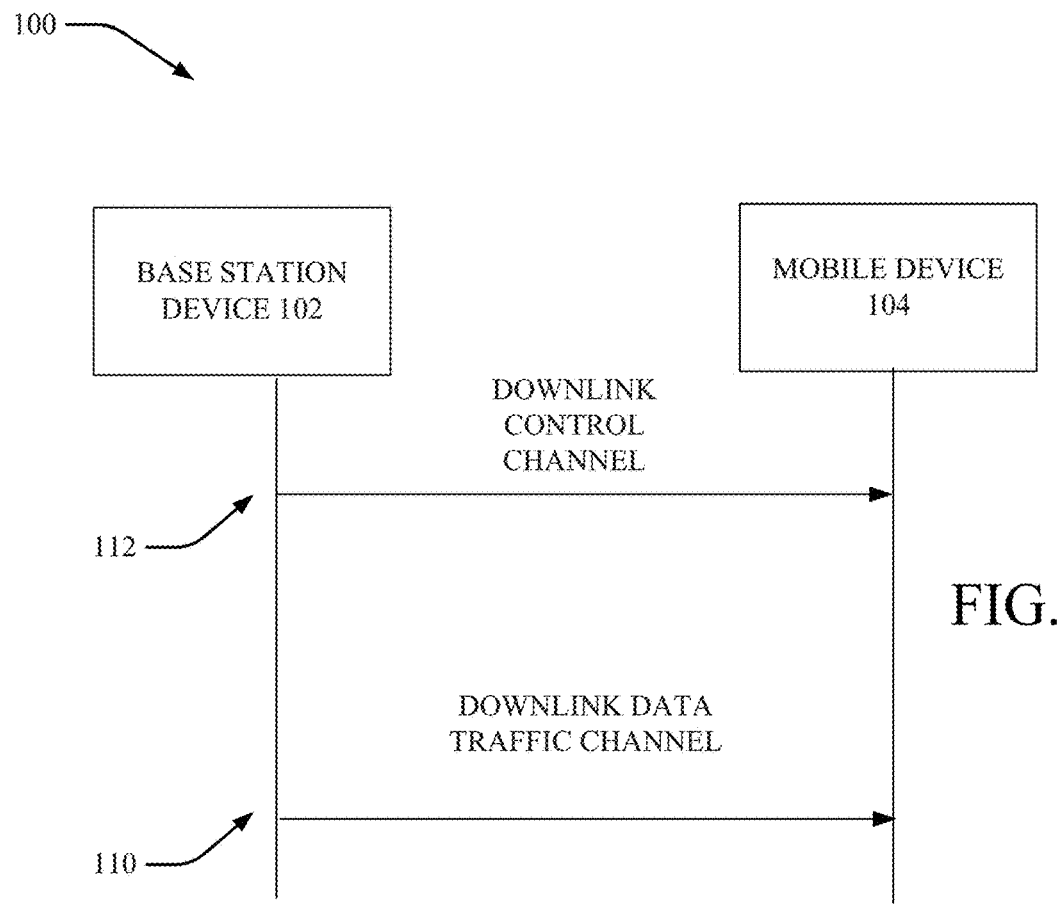
FIG. 1A and FIG. 1B illustrate example, non-limiting message sequence flow charts to facilitate an enhanced two-stage downlink control channel and an uplink control channel, respectively, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating an enhanced two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not taken into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate.

The communication link-system performance can be enhanced with the use of forward error correction codes. When forward error correction is applied to the information block the additional parity bits are added to the information bits. These additional parity bits can protect the information bits when passed through the communication channel from effects of the channel (e.g., Additive White Gaussian Noise (AWGN), multipath fading etc.). Currently, 3GPP is discussing forward error correction codes for control channels, which have short block length for 5G systems.

To meet the huge demand for data centric applications, currently 3GPP is looking towards extending the current 4G standards to 5G. However, there are numerous challenges and/or issues that are expected to arise. The communication between the transmitter and the receiver are typically impacted by multipath fading. Link adaptation based on channel conditions can mitigate the impact of fading channels by transmitting robust modulation and/or code rate when the signal is experiencing poor channel conditions and transmitting higher modulation and/or code rate when the signal is experiencing good channel conditions. These approaches can be used in data traffic channels in limited scenarios (e.g., in the 3G and 4G systems).

Unfortunately, this approach cannot be employed for downlink control channels since downlink control channels convey the information about the modulation and code rate for the data traffic channel. The downlink control channel can convey the scheduling information to the mobile device.

As used herein, "5G" can also be referred to as New Radio (NR) access. One or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE. Typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

In wireless communication systems, the number of resources allocated for a data channel is indicated in the control channel. The mobile device can search the region where the control channel is located (e.g., orthogonal frequency division multiplexing (OFDM) symbols and the resource elements). However there are several disadvantages to the legacy control design. There is a need to have separate reference symbol (RSs) for control and data. In LTE, physical downlink control channel (PDCCH) decoding is based on cyclic redundancy check (CRS) while physical downlink shared channel (PDSCH) decoding is based on demodulation reference signals (DMRS) (for the later releases LTE) Also, SPS can apply to both resource allocation, link adaption (e.g., modulation-and-coding scheme (MCS) selection) while in reality, it can be helpful to have SPS for either resource allocation or link adaption. In some systems, while first stage downlink control information (DCI) can include all the essential information for the mobile device to decode the packet, second stage DCI can include some complimentary information to enhance the mobile device receiver performance, and second stage DCI can be embedded with PDSCH sharing the DMRS of PDSCH.

Currently, 3GPP is discussing the control channel design for NR systems. There are two approaches which are interesting. In the first approach, the downlink control channel is transmitted in two parts. In the first part, the network sends a part of the DCI that is common to certain group of mobile devices, and in the second part other parameters of the DCI can be transmitted for individual mobile devices. In the second approach, all the DCI parameters are transmitted to all mobile devices at once (in a single transmission). The methods outlined in this document are applicable to both the approaches.

In some systems, unlike the embodiments described herein that concern the control channel in 5G, first stage DCI can be provided as broadcast information. One or more embodiments described herein can provide an enhanced two stages control framework. The first stage DCI can be used to indicate the resource allocation for PDSCH and/or PUSCH while the second stage DCI/UCI can be used to indicate the MCS, MIMO layers information and/or HARQ for PDSCH and/or PUSCH. As used herein, the term "second stage DCI" can mean the second stage DCI transmitted on the allocated downlink data channel (e.g., PDSCH) for the mobile device and the term "second stage UCI" can mean the second stage UCI transmitted on the downlink data channel and providing information to facilitate transmission on the uplink channel (e.g., PUSCH) for the mobile device. The first stage DCI can be located in the control channel region while the second stage DCI/UCI can be embedded with PDSCH and/or PUSCH and can share the DMRS with data (as opposed to being transmitted with control information).

In one embodiment, an apparatus is provided. The apparatus can comprise: a processor; and a memory that stores executable instructions that, when executed by the processor, facilitate performance of operations. The operations can comprise: performing first processing for a first decoding of a first stage of downlink control information received via a downlink control channel employing a blind decoding of the first stage of downlink control information, wherein the first stage of downlink control information comprises resource allocation information, and determining whether the first decoding of the first stage of downlink control information by the mobile device was successful. The operations can also comprise based on the determining indicating that the first decoding the first stage of downlink control information was successful and based on the resource allocation information from decoded first stage of downlink control information, performing second processing for a second decoding of a second stage of downlink control information employing the resource allocation information of the first stage of downlink control information and without employing the blind decoding, wherein the second stage of downlink control information is transmitted in a downlink data channel for the mobile device.

In another embodiment, a method is provided. The method can comprise: receiving, by a mobile device comprising a processor, at a first time, a first stage of downlink control information via a downlink control channel of the mobile device, wherein the first stage of downlink control information comprises resource allocation information and a reference signal usable to decode the first stage of downlink control information by the mobile device; and based on successfully decoding the first stage of downlink control information, determining, by the mobile device, the resource allocation information for a data packet received within a data channel of the mobile device; and determining, by the mobile device, whether a second stage of downlink control information was received based on a result of attempting to decode the second stage of downlink control information.

In another embodiment, a machine-readable storage medium, comprising executable instructions that, when executed by a processor, facilitate performance of operations. The operations can comprise: performing processing to attempt to decode a second stage of downlink control information based on resource allocation information and a reference signal determined by decoding a first stage of downlink control information, wherein the decoding of the first stage of downlink control information comprises blind decoding, and wherein uplink control information and the second stage of downlink control information are received after the first stage of downlink control information; and based on successfully decoding the second stage of downlink control information, decoding a physical data shared channel for a mobile device comprising the processor, wherein the decoding the physical data shared channel is performed using first data decoding information and the resource allocation information. The operations can also comprise based on failing to successfully decode the second stage of downlink control information, decoding the physical data shared channel for the mobile device using second data decoding information and the resource allocation information.

FIG. 1A and FIG. 1B illustrate example, non-limiting message sequence flow charts to facilitate an enhanced two-stage downlink control channel and an uplink control channel, respectively, in accordance with one or more embodiments described herein.

With reference to FIGS. 1A and 1B, one or more of reference signals and/or pilot signals can be transmitted within the systems shown 100, 101. The reference signals and/or the pilot signals can be beamformed or non-beamformed. The mobile device 104 can compute the channel estimates then determine the one or more parameters needed for channel state information (CSI) reporting. The CSI report can comprise, for example channel quality indicator (CQI), preceding matrix index (PMI), rank information (RI), the best subband indices, best beam indices etc. or any number of other types of information.

As shown in FIG. 1A, the CSI report can be sent from the mobile device 104 to the BS device via a feedback channel (not shown). The BS device 102 scheduler can use this information in choosing the parameters for scheduling of the particular mobile device 104. As used herein, the term "BS device 102" can be interchangeable with (or include) a network, a network controller or any number of other network components. The BS device 102 can send the scheduling parameters and/or resource allocation information (along with a reference signal) to the mobile device 104 in the downlink control channel (e.g., downlink control channel 112). For example, the BS device 102 can send a first stage DCI to the mobile device 104 via downlink control channel 112.

After this information is transmitted, in some embodiments, the data traffic channel 110 can transmit the second stage DCI (indicated in FIG. 1A) and the second stage UCI (indicated in FIG. 1B) along with a reference signal for the mobile device 104. The transmissions of second stage DCI and second state UCI can be concurrent and/or simultaneous. In some embodiments, when SPS scheduling is not employed by the BS device 102, a first stage DCI as well as a second stage DCI and second stage UCI is transmitted to the mobile device 104. In other embodiments, the SPS can be employed for the second stage DCI and second stage UCI or only for the first stage DCI. As such, in some transmission time intervals (TTIs) (e.g., a slot or a mini-slot), a new first stage DCI is transmitted from the BS device 102 to the mobile device 104 while in some TTIs, only a new first stage DCI or only a new second stage DCI (and new second stage UCI) are transmitted to the mobile device 104.

Further, the actual data transfer can be provided from the BS device 102 to the mobile device 104 over the data traffic channel 110. Actual data transfer can also be provided from the mobile device 104 to the BS device 102 via the uplink data traffic channel 114 based on second stage UCI information received over the data traffic channel. Accordingly, in one or more embodiments described herein, operations can be enhanced employing SPS capability for part of the control information (either for transmission of the first stage or the second stage DCI). Traditional SPS does not typically allow dynamic link adaption or resource allocation (MCS is fixed for the whole period). In one or more embodiments describe herein, a two stage design can allow change of one or more parts of the information at different TTIs.

The downlink control channel can carry first stage DCI such as resource allocation information. The second stage DCI and/or the second stage UCI can include, but is not limited to, a number of multiple input multiple output (MIMO) layers scheduled, transport block sizes, modulation for each codeword, parameters related to hybrid automatic repeat request (HARQ), subband locations and also precoding matrix index corresponding to the sub bands. Additionally, typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

In some embodiments, downlink control channel can also carry data in one or more subcarriers of an OFDM control channel symbol to improve efficiency of the control channel. In some embodiments, the downlink control channel can include data or control channel information.

Figure 2:
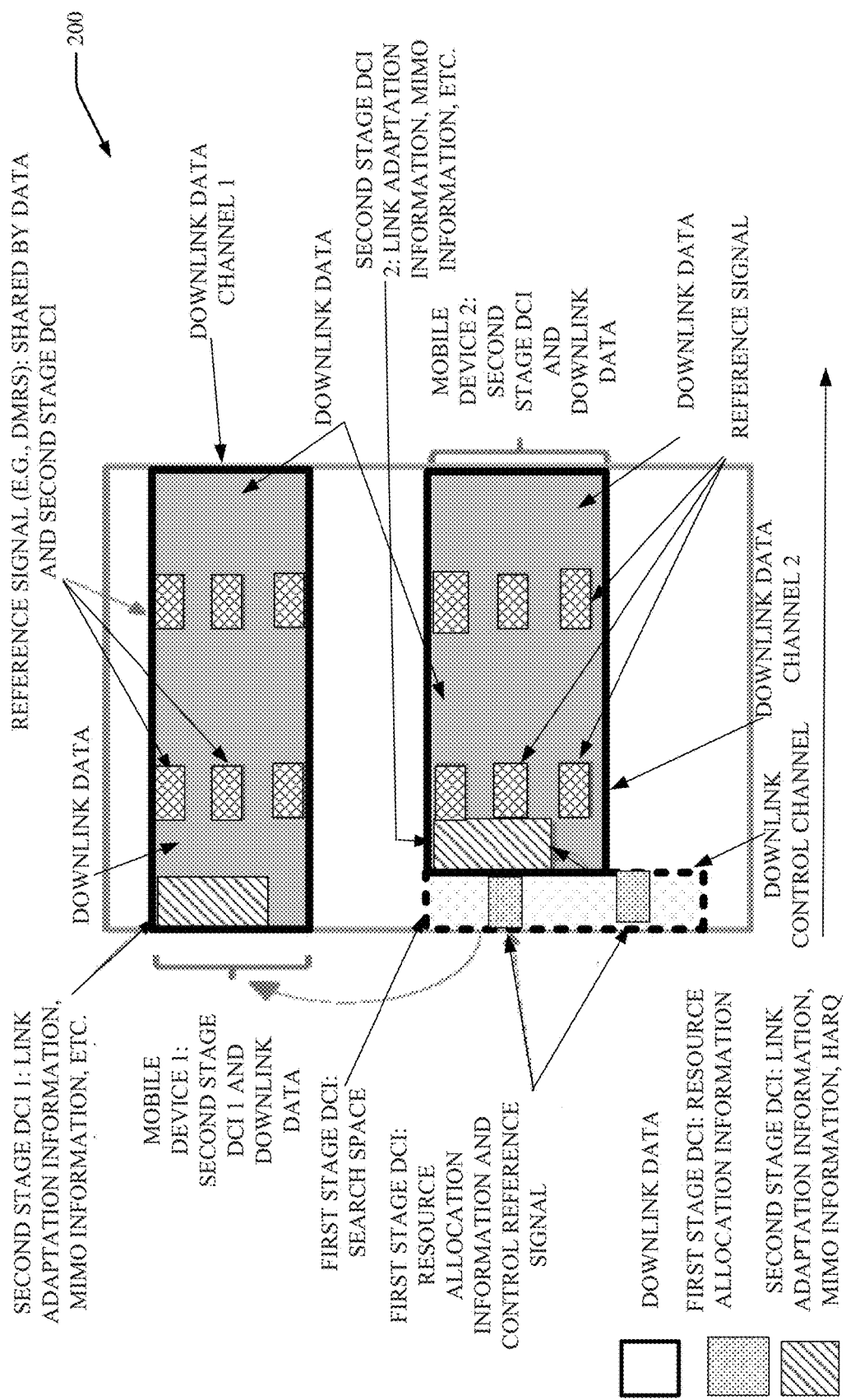
FIG. 2 illustrates an example, non-limiting diagram of a framework for an enhanced two-stage downlink control channel in accordance with one or more embodiments described herein.

One or more aspects of the systems 100, 101 will be described with reference to FIGS. 2, 3, 4, 5, 6, 7, 8 and/or 9. FIG. 2 illustrates an example, non-limiting diagram of a framework for an enhanced two-stage downlink control channel in accordance with one or more embodiments described herein. Turning first to FIG. 2, framework 200 is but one example of an embodiment of a framework to facilitate enhanced two-stage downlink control channels. While the drawing indicates the downlink data channel for data transmission, in various embodiments, although not shown, an uplink data channel can be employed for transmission of data from the mobile device 104 as described with reference to system 101 of FIG. 1B. As such, the same steps can be performed as will be described in FIG. 2 for the transmission of first stage DCI, second stage DCI and second stage UCI.

However, for transmission of second stage UCI, the mobile device can employ the uplink to transmit data in lieu of employing the downlink (e.g., the FIG. 2 indicators of "downlink data" can be replaced with "uplink data" and the indicators or "downlink data channel" can be replaced with "uplink data channel").

Other embodiments, including those described with reference to framework 300 of FIG. 2 (which employs SPS of the second stage DCI (and/or second stage UCI) and SPS first stage DCI in various TTIs) can also be employed in various embodiments in addition to or as an alternative to framework 200.

Turning now to FIG. 2, in some embodiments, the first stage DCI (e.g., first stage DCI 402) can include resource allocation information. For example, the resource allocation information can be transmitted over the downlink control channel from the BS 102 to the mobile device 104. In the embodiments described herein, the first stage DCI 402 can be transmitted in a control channel region and can include a reference signal (e.g., demodulation reference signal (DMRS)) to facilitate the mobile device 102 blind decoding the first stage DCI 402. The drawing shows the framework for two mobile devices and therefore there is resource allocation information for a first mobile device ("mobile device 1" in FIG. 2, which can be mobile device 104) and for a second mobile device ("mobile device 2" in FIG. 2, which can be another mobile device (not shown in FIG. 1)).

In some embodiments, for each slot (or for each mini-slot) of transmission, there can be a control channel region and the mobile device 104 can search for a first stage DCI to blind decode. In some embodiments, for selected ones of one or more different slots (or one or more different mini-slots) of transmission there can be a control channel region.

As shown in FIG. 2, the blind decoding of the mobile device can be performed by the receiver assuming there are multiple possible locations of the resource allocation information and/or reference signals within the search space shown for the search space.

While the first stage DCI can be transmitted over the downlink control channel for the mobile device 104 as shown in FIG. 2, the second stage DCI and/or second stage UCI can be transmitted over the downlink data channel and, as such can be included in downlink data. Accordingly, for each mobile device, the mobile device can receive a separate second stage DCI and/or second stage UCI over the downlink data channel.

As shown in FIG. 2 by arrow, the resource allocation information of the first stage DCI is used to attempt to decode the second stage DCI and/or the second stage UCI of the mobile device 1 and the mobile device 2. Accordingly, a first arrow from the first stage DCI pointing to the second stage DCI and/or second stage UCI is shown within downlink data channel 2. A second arrow from the first stage DCI pointing to the second stage DCI and/or second stage UCI is shown within downlink data channel 1. The first stage DCI resource allocation and/or reference signal can be employed to attempt to decode each of the second stage DCI and/or second stage UCI for mobile device 1 and/or mobile device 2.

In various embodiments, the second stage DCI/UCI can include, but is not limited to, various other information (other than resource allocation information) including, but not limited to, MCS, MIMO information (e.g., MIMO layer information), etc. In some embodiments, as shown herein, the second stage DCI/UCI can include HARQ information.

As shown in FIG. 2, the second stage DCI and/or second stage UCI transmission can be embedded with the data channel in some embodiments (e.g., downlink data channel 1 for mobile device 1 and downlink data channel 2 for mobile device 2).

In some embodiments, the second stage DCI and/or second stage UCI can be embedded in the downlink data channels with reference signals. For example, as shown, one or more reference signals can be included in downlink data channel 1 and one or more reference signals can be included in downlink data channel 2 to facilitate the different mobile devices in decoding their respective downlink data channels.

In some embodiments, the second stage DCI can be embedded with the downlink data PDSCH. The second stage UCI can be embedded with the uplink data PUSCH.

Figure 3:
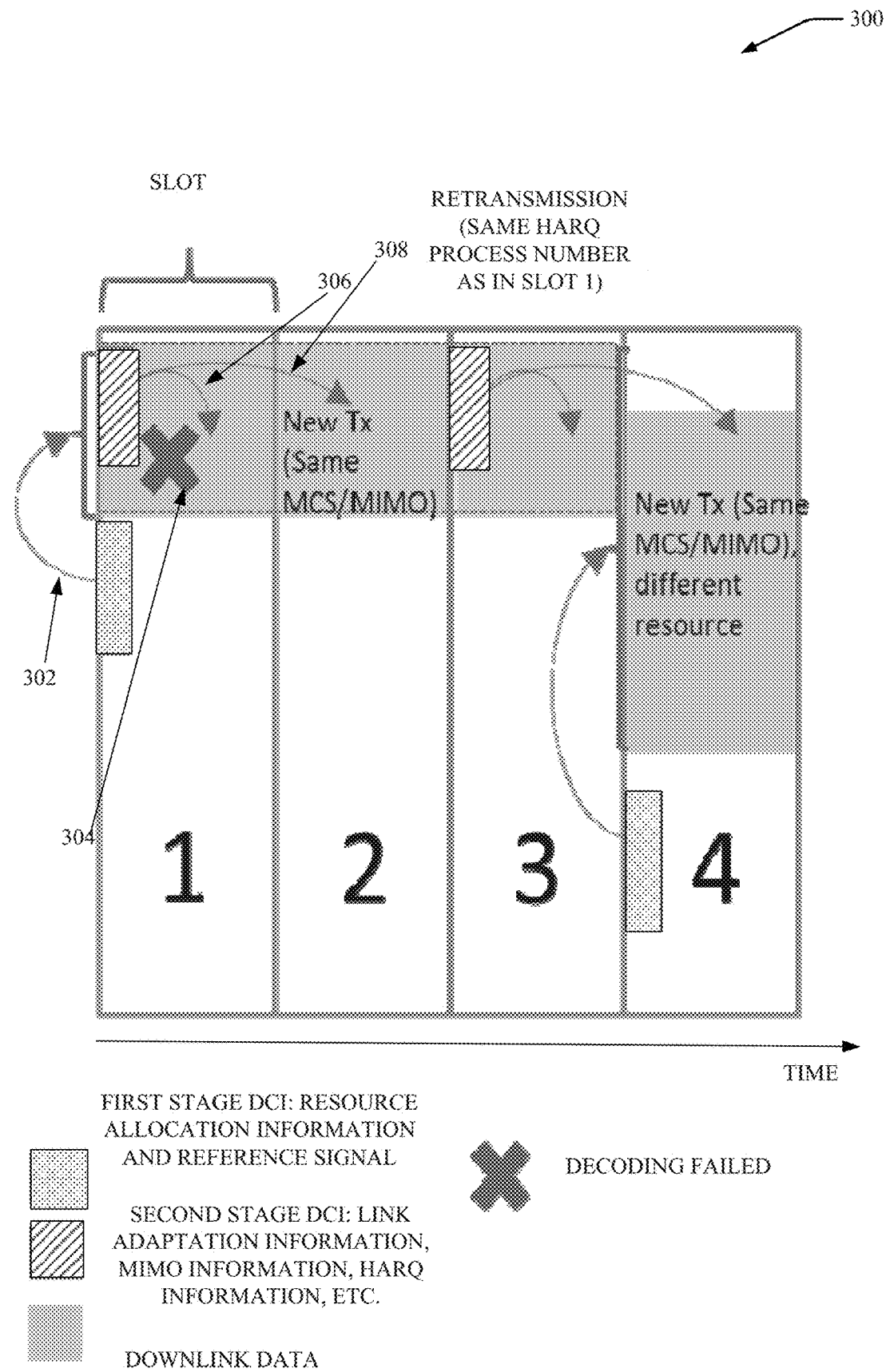
FIG. 3 illustrates an example, non-limiting diagram of a system for applying an enhanced two-stage downlink control channel framework including semi-persistent scheduling (SPS) in accordance with one or more embodiments described herein.

FIG. 3 illustrates an example, non-limiting diagram of a system for applying an enhanced two-stage downlink control channel framework in semi-persistent scheduling (SPS) in accordance with one or more embodiments described herein. The embodiment shown in FIG. 3 is for a single mobile device (e.g., mobile device 104). Shown are slots 1, 2, 3, and 4. While slots are indicated, each slot can alternatively represent a mini-slot (resulting in four mini-slots being shown in FIG. 5 in some embodiments).

In some embodiments, in each TTI, the mobile device 104 attempts to decode a first stage DCI (by blind decoding) and second stage information. The second stage information can comprise the second stage DCI and/or the second stage UCI. However, as shown, while in TTI 1, first stage DCI and second stage information is received, in TTI no first stage or second stage information is received, in TTI 3 only second stage information is received and in TTI 4 only first stage information is received. SPS is exhibited in FIG. 3 in some embodiments allowing the BS device 102 to selectively determine when to transmit the first stage DCI and/or the second stage information to the mobile device 104.

As shown in FIG. 3, at TTI 1 (which may be a slot or a mini-slot), the mobile device 104 can attempt to first blind decode the first stage DCI. For example, the mobile device can blind decode in a search space within the control channel. In some embodiments, the first stage DCI has a radio network temporary identifier (RNTI) related to the identifier for the mobile device. As such, the mobile device 104 can self-verify that the first stage DCI has been successfully decoded. In some embodiments, the mobile device 104 can self-verify such information using cyclic redundancy check (CRC).

In some embodiments, the mobile device can blind decode one or more positions in the search space for the control channel to successfully decode the first stage DCI. In some embodiments, the reference signal (not shown) can be employed to facilitate the decoding of the control channel region by the mobile device 104.

As shown in the arrow at 302, after the mobile device 104 has successfully decoded the first stage DCI, the mobile device 104 can then have access to and know the resource allocation information for the downlink data transmission (e.g., the data transmission over the PDSCH) for the mobile device 104 and/or for the uplink data transmission (e.g., the data transmission over the PUSCH) for the mobile device 104.

In some embodiments, the resource allocation information can include information indicating allocation in the frequency domain (e.g., which physical resource blocks (PRBs) are assigned to the mobile device 104) and/or indicating allocation in the time domain (e.g., how many slots or mini-slots are assigned to the mobile device 104). Employing the knowledge of the assigned PDSCH or PUSCH, the receiver of the mobile device 104 can know the position of the second stage DCI and/or the second stage UCI (and therefore need not blind decode for the second stage DCI and/or the second stage UCI) since, for example, the second stage DCI can be embedded in the particular PDSCH resource allocated by the first stage DCI (and which is determined by the mobile device after successfully decoding the first stage DCI). In some embodiments, however, the mobile device 104 may not know whether second stage DCI and/or second stage UCI is received and therefore may try to decode but second stage DCI and/or second stage UCI is not present in the TTI.

Although now shown, the second stage UCI can be embedded in the PUSCH resource allocated by the first stage DCI (and which is determined by the mobile device after successfully decoding the first stage DCI). The second stage DCI/UCI can be located at the first symbol of the assigned PDSCH or PUSCH resource.

In some embodiments, the same reference signal (e.g., the same DMRS) can be used for the decoding of second stage DCI over the PDSCH or for the decoding of the UCI over the PUSCH. This reference signal, however, can differ from the reference signal transmitted with the first stage DCI in some embodiments.

If the mobile device 104 successfully decodes the second stage DCI and/or the second stage UCI, the mobile device 104 can then operate according to the decoded information, including the MCS, HARQ and MIMO layers information, etc. to decode the data packets (not shown) in the PDSCH or PUSCH (excluding the resource used for second stage DCI and/or the second stage UCI).

Shown in TTI 1 is a case in which the mobile device 104 successfully decodes first stage DCI and second stage information (e.g., second stage DCI and/or second stage UCI) and the mobile device 104 has received all information to decode downlink data. The HARQ information obtained from successfully decoding the second stage DCI and/or second stage UCI can indicate whether the data packet being decoded is a new retransmission or re-transmission.

Although the decoding of the first stage DCI and the second stage information was successful, shown in TTI 1 (at 304) is a case in which there is a failure by the mobile device 104 to successfully decode one or more data packets. Due to the failure of the decoding of the data packet, but the delay in NACK packet from the mobile device 104 (and therefore, the NACK has not arrived at the BS device 102 and/or network device), the BS device 102 continues to transmit the next downlink data packet.

As such, in TTI 2, there is no first stage DCI and no second stage information transmitted from the BS device 102. The first stage DCI can indicate an SPS for PDSCH or PUSCH, which can result in a fixed resource allocation for multiple PDSCH/PUSCH transmissions as shown in FIG. 3 (the fixed resource allocation is shown for TTI 2 and 3 of FIG. 3). At 306, the second stage DCI and/or the second stage UCI will indicate the MCS, HARQ and/or MIMO layer information for downlink data.

As described, in TTI 2, there is no first stage DCI and no second stage information transmitted from the BS device 102. As such, the mobile device 104 can then employs the previous resource allocation information from first stage DCI blind decoded in TTI 1 and decoded second stage information (e.g., second stage DCI and/or second stage UCI) (e.g., MCS and/or MIMO) decoded in TTI 1. So notwithstanding TTI 2 shows a new transmission of a new data packet received at the mobile device 104, the mobile device 104 employs the previous resource allocation information from first stage DCI blind decoded in TTI 1 and decoded second stage information (e.g., second stage DCI and/or second stage UCI) (e.g., MCS and/or MIMO) decoded in TTI 1 to decode the newly received data packet indicated as a "TX" in TTI 2.

Shown in FIG. 3, at some time before TTI 3, the BS device 102 and/or network will receive information (e.g., NACK packet) indicating the data packet in TTI 1 was not successfully decoded and the BS device 102 will not need to retransmit the first stage DCI for transmitting the data packet but will re-transmit the second stage information associated with the data packet received in TTI 1 that could not be decoded. Thus, the mobile device 104 can receive a re-transmission of the second stage information (e.g., second stage DCI and/or second stage UCI) from the TTI 1 and the data packet. The second stage information from slot 1 can also include the HARQ information from TTI 1 for decoding and utilizing the data packet.

In TTI 4, a new transmission of first stage DCI is received by mobile device 104 in order to update resource allocation information for the mobile device 104. The mobile device 104 can blind decode the first stage DCI received in TTI 4 and employ the same MCS/MIMO from the second stage information of TTI 3 (since no second stage information was received). Only when the resource allocation for the mobile device 104 is being changed (e.g., TTI 4 shows a larger bandwidth relative to that for TTI 1, 2, 3) does a new first stage DCI need be sent. The key design advantage is the ability to do SPS-like operation for first stage and/or second stage information separately as shown in FIG. 3.

Because SPS-like operations can be performed in some embodiments, such as those shown in FIG. 3, in some slots (or some mini-slots) no second stage DCI and/or no second stage UCI need be sent from the BS 102 and the mobile device 104 can proceed with using the specified parameters and/or values previously received (and, in some embodiments, stored) at the mobile device. As such, the amount of traffic transmitted can be reduced and/or processing can be made more efficient for the BS device 102 and/or the mobile device 104.

In some embodiments, after a determination that there was no second stage DCI and/or second stage UCI received, in the next time slot, as shown at arrow 308, the mobile device receiver can attempt to decode the whole PDSCH or PUSCH (including all the resource allocated) assuming that a new transmission of second stage DCI and/or second stage UCI has been received and using the MCS and MIMO information from the previous (e.g., last) successfully received second stage DCI and/or second stage UCI.

With regard to some embodiments, a timer can be employed if there is an attempt to decode second stage information and such is not successful. The mobile device 104 can assume the last second stage information received will be used for decoding data. However, in some networks, there may be a very long time (e.g., numerous TTI) during which the second stage information has not been received by the mobile device 104. In lieu of awaiting another second stage information to be transmitted, if the timer expires, the mobile device 104 can request re-transmission of second stage information. As such, the timer is employed to limit the amount of time that the same second stage information previously received is to be re-used by the mobile device 104.

In some embodiments, the SPS scheduling by the first stage DCI can be turned on by the high layer. Once turned on, the SPS first stage DCI can allocate periodical PDSCH or PUSCH transmission with defined resource allocation. In some embodiments, for each (or, in some embodiments, one or more) PDSCH or PUSCH scheduled by SPS first stage DCI, the mobile device receiver will try to decode the second stage DCI and second stage UCI as described above (e.g., based on the assigned PDSCH or PUSCH, receiver knows position of second stage DCI and second stage UCI; the second stage DCI is embedded in the PDSCH resource allocated by first stage DCI while second stage UCI is embedded in the PUSCH resource allocated by first stage DCI. Typically, the second stage DCI and second stage UCI is located at the first symbol of the assigned PDSCH and PUSCH, respectively, resource).

In various embodiments, the systems described herein can provide approaches for the control channel transmission. In the first approach, the control channel is transmitted in two parts. In the first part, the network sends some portion of the DCI that is common to certain group of mobile devices, and in the second part other parameters of the DCI are transmitted for individual mobile devices. In the second approach, all the DCI parameters are transmitted to all (or, in some embodiments, to one or mobile devices) at once (or in a single transmission, simultaneously and/or concurrently). The embodiments detailed herein are applicable to both the approaches.

In some embodiments, there are two stages of DCI design. In some embodiments, first stage DCI can include resource allocation information while second stage DCI/UCI can include all (or, in some embodiments, various) other information including, but not limited to, HARQ, MCS, MIMO layers, etc. In some embodiments, one or more stages (or each stage) can be configured as SPS operation separately.

In some embodiments, the first stage DCI can be transmitted in a control channel region using the reference signal for decoding. In some embodiments, the control channel region can be allocated for each slot or each mini-slot (or, in some embodiments, one or more slots or one or more mini-slots). In some embodiments, the second stage DCI/UCI transmission can be embedded with the data channel. And using the DMRS for data channel for decoding. The second stage DCI can be embedded with downlink data PUSCH and second stage UCI can be embedded with uplink data PUSCH.

In some embodiments, enhanced SPS capability for part of the control information can be employed. One or more embodiments can allow dynamic link adaption and/or resource allocation. In some embodiments, two stages design can allow to change part of the information (e.g., second stage DCI/UCI can change the MCS for every PDSCH/PUSCH transmission with SPS resource allocation indicated by first stage DCI). Or the first stage DCI can change the resource allocation every PDSCH/PUCCH transmission with fixed MCS/MIMO indicated by SPS second stage DCI. In lieu of relying on dynamic DCI for retransmission, one or more embodiments can employ second stage DCI/UCI to indicate the retransmission. In some embodiments, better channel estimation can be provided via second stage DCI being embedded with data transmission and therefore being able to share the DMRS for data, resulting in less overhead and better channel estimation results.

Figure 4:
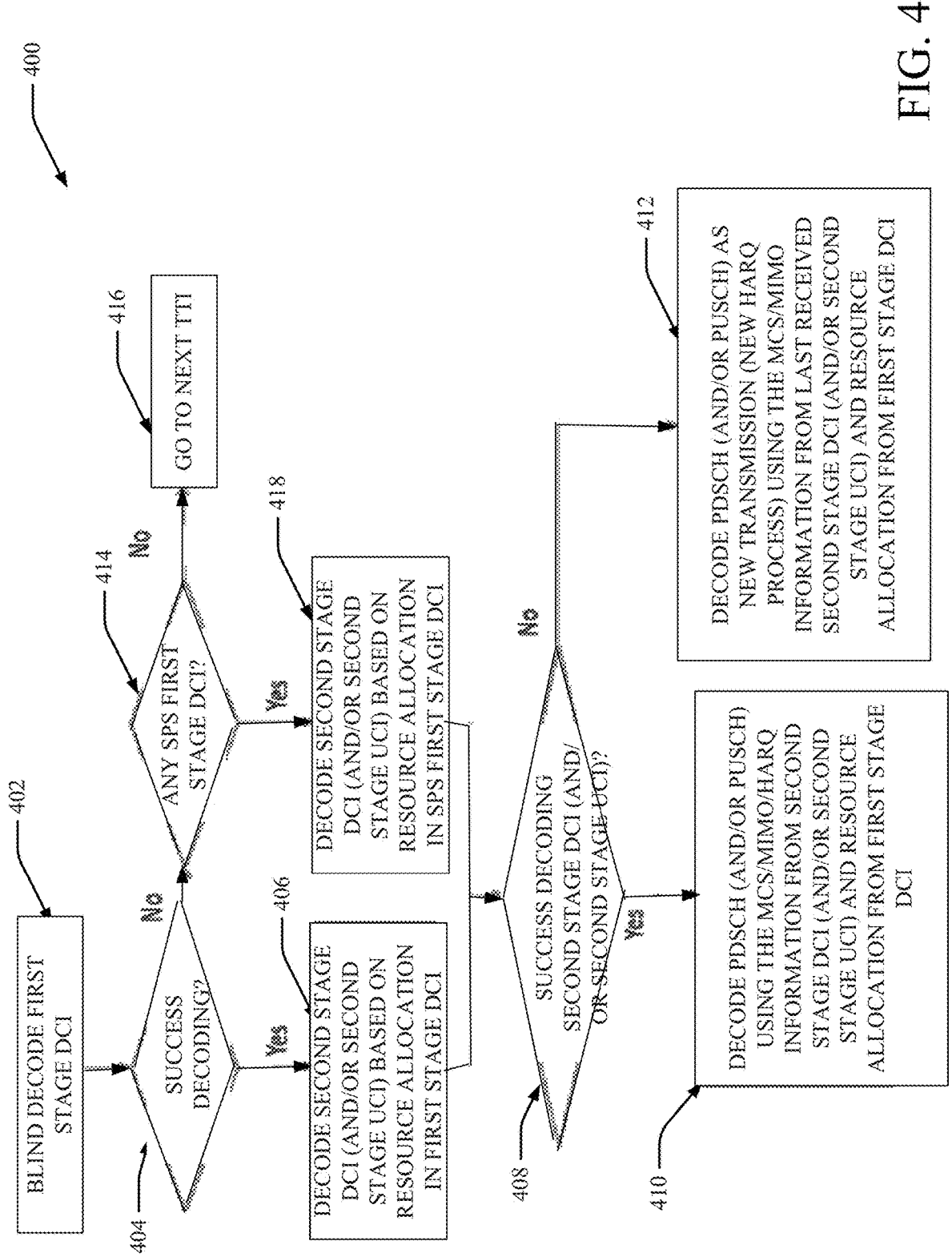
FIG. 4 illustrates an example, non-limiting flow diagram of mobile device behavior in accordance with one or more embodiments described herein.

FIG. 4 illustrates an example, non-limiting flow diagram of mobile device behavior in accordance with one or more embodiments described herein. At 402, the mobile device receiver can attempt to blind decode a first stage DCI received from the BS 102. At 404, the mobile device 104 determines whether the blind decoding was successful (e.g., determined, in some embodiments, based on a cyclic redundancy check (CRC) performed by the mobile device).

If blind decoding of the first stage DCI is determined to be successful, at 406, the mobile device 104 uses the information (e.g., resource allocation information) decoded in first stage DCI to attempt to decode second stage DCI.

If blind decoding of the first stage DCI is determined to not be successful, the mobile device 104 can determine whether there is any SPS of first stage DCI at step 414. For example, perhaps the BS device 102 did not transmit a first stage DCI in the TTI in which the mobile device 104 is attempting to blind decode the first stage DCI.

At 416, the mobile device can go to the next TTI to await another first stage DCI if it is determined that there is no SPS of the first stage DCI. In this case, as shown at TTI indicated by slot 2 and slot 3 of FIG. 3, it is assumed by the mobile device that a first stage DCI was transmitted to the mobile device but not successfully decoded for one reason or another. A retransmission request can be generated by the mobile device 104.

At 418, the mobile device can employ the resource allocation information from the resource allocation information in SPS first stage DCI (and/or, in some embodiments in the last received/previously received first stage DCI in lieu of awaiting new resource allocation information) for decoding second stage DCI or second stage UCI in the TTI during which the first stage DCI was not received and/or not successfully blind decoded) to attempt to decode the second stage DCI (and/or to attempt to decode the second stage UCI) if it is determined that SPS is activated for the first stage DCI. In some embodiments, if the first stage DCI is the very first received and there is no previous first stage DCI information, the mobile device 104 can utilized stored information and/or information obtained from the BS 104 and/or some other source to which the mobile device 104 is communicatively coupled.

At 404, the mobile device 104 can determine that blind decoding of the first stage DCI was successful and proceed, at 406, by attempting to decode the second stage DCI and/or the second stage UCI based on the resource allocation information for first stage DCI. In particular, at 406, the mobile device 104 can attempt to decode the second stage DCI (and/or the second stage UCI). The decoding of the second stage DCI (and/or the second stage UCI) can be performed utilizing, for example, the resource allocation information obtained by the mobile device 104 upon successfully blind decoding the first stage DCI. While the first stage decoding is performed in accordance with blind decoding, the second stage decoding need not be performed in accordance with blind decoding. However, in various embodiments, because of the possibility of SPS for second stage DCI and/or for second stage UCI, the mobile device 104 may not know whether it has received second stage DCI and/or second stage UCI upon attempting to decode in steps 406 and/or 418.

At 408, the mobile device 104 can determine if the decoding of second stage DCI and/or second stage UCI is successful. The mobile device at 410 can decode the downlink data channel (e.g., PDSCH) using the MCS/MIMO (and, in some embodiments, HARQ information) from second stage DCI and resource allocation information from first stage DCI.

At 408, the mobile device 104 can determine if the decoding of second stage DCI and/or second stage UCI is successful. The mobile device at 412 can decode the downlink data channel (e.g., PDSCH) as a new transmission using the MCS/MIMO (and new HARQ information) from the last/previously received second stage DCI and resource allocation information from first stage DCI. In some embodiments, if the second stage DCI is the very first received and there is no previous second stage DCI information, the mobile device 104 can utilized stored information and/or information obtained from the BS 104 and/or some other source to which the mobile device 104 is communicatively coupled.

Figure 5:
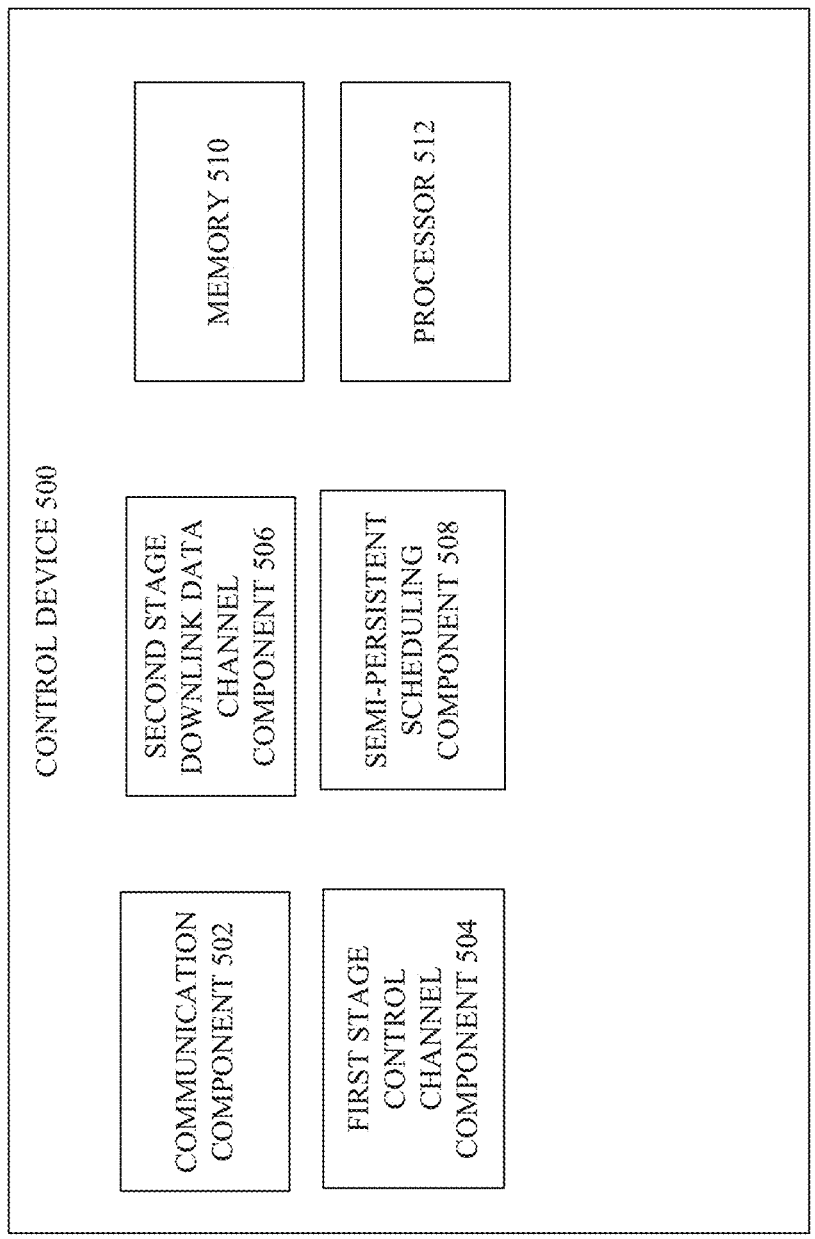
FIG. 5 illustrates an example, non-limiting block diagram of a control device that can facilitate an enhanced two-stage downlink control channel in accordance with one or more embodiments described herein.

Turning first to FIG. 5, the control device 500 can be comprised in the BS device 102 and/or any other network control device that can generate information for control of the information to be transmitted on the downlink control channel. In one or more embodiments, the BS device 102 and/or the control device 200 can indicate the first stage DCI, second stage DCI, second stage UCI for one or more mobile devices dynamically (e.g., via physical layer signaling, example DCI signaling) or semi-statically (e.g., higher layer or radio resource control (RRC) signaling). The communication component 502 can transmit data packets on the downlink, the first stage DCI, second stage DCI and/or second stage UCI. The communication component 502 can also receive a NACK or other communication from the mobile device 104 including, but not limited to, data packets on the uplink. The first stage control channel component 504 can formulate the first stage DCI and/or make a determination regarding resource allocation for one or more different mobile devices (including mobile device 104). The second stage downlink data channel component 506 can generate and/or determine second stage DCI and/or second stage UCI including determining MCS, MIMO, HARQ information and the like for one or more different mobile devices. The SPS component 508 can determine whether to forgo transmission of new first stage DCI and/or new second DCI and/or new second stage UCI for one or more TTI for one or more different mobile devices. Memory 510 can store one or more machine-readable and/or computer-readable instructions that can be executed by processor 512 to perform one or more functions of control device 500.

Figure 6:
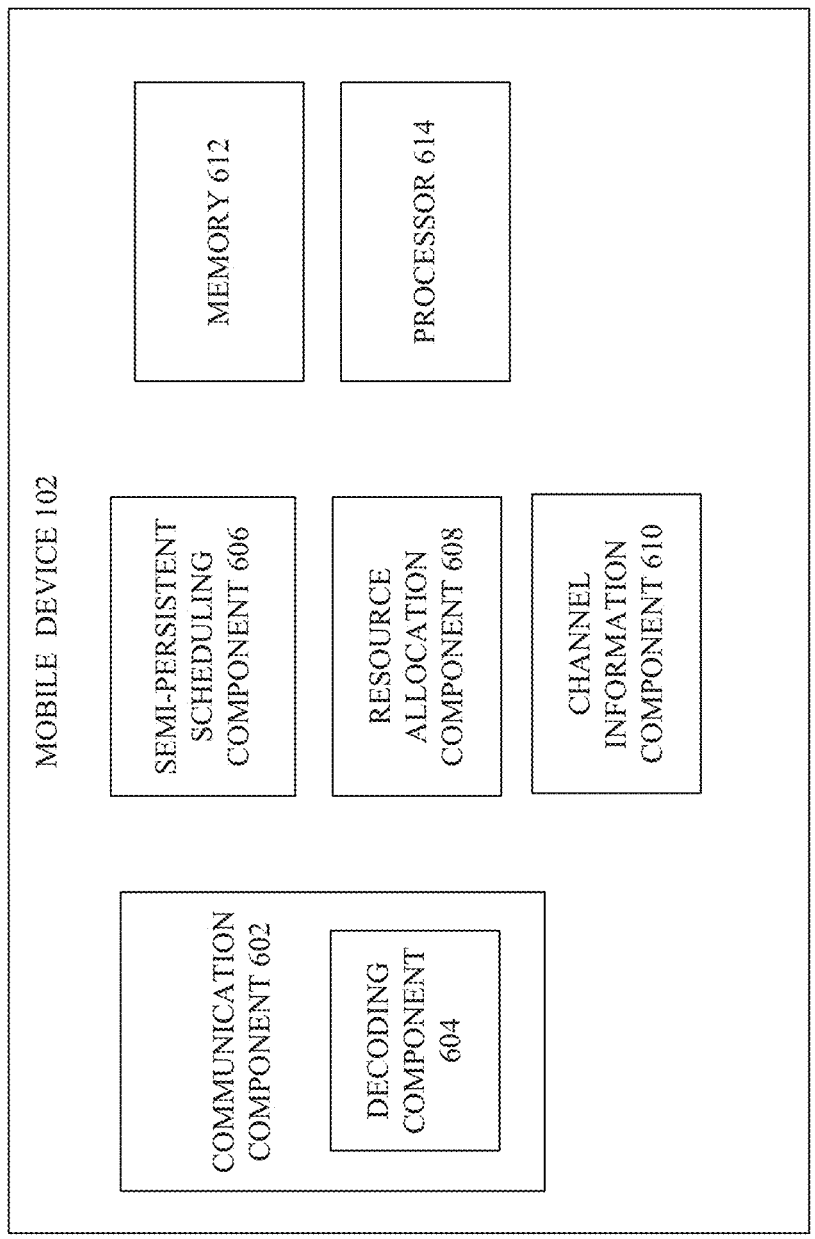
FIG. 6 illustrates an example, non-limiting block diagram of a mobile device for which an enhanced two-stage downlink control channel can be facilitated in accordance with one or more embodiments described herein.

Turning now to FIG. 6, the mobile device 104 can include a communication component 602. The communication component 602 can include a receiver (e.g., decoding component 604) that can perform blind decoding, decoding and/or CRC operations and the like. The communication component can also receive and/or transmit data packets. The communication component can receive the first stage DCI, second stage DCI, second stage UCI from the BS device 102 in some embodiments. The communication component 602 can transmit NACK or other communication from the mobile device 104 including, but not limited to, data packets on the uplink. The resource allocation component 608 can determine resource allocation information from decoding the first stage DCI and/or make a determination regarding resource allocation from previously received or stored resource allocation information. The channel information component 610 can determine MCS, MIMO, HARQ information and the like for the mobile device 104 based on decoding second stage information and/or using previously received or stored decoded/ing information from the second stage information (once that second stage information is decoded). The SPS component 606 can determine whether SPS is indicated for one or more TTIs. Memory 612 can store one or more machine-readable and/or computer-readable instructions that can be executed by processor 614 to perform one or more functions of mobile device 104.

Figure 7:
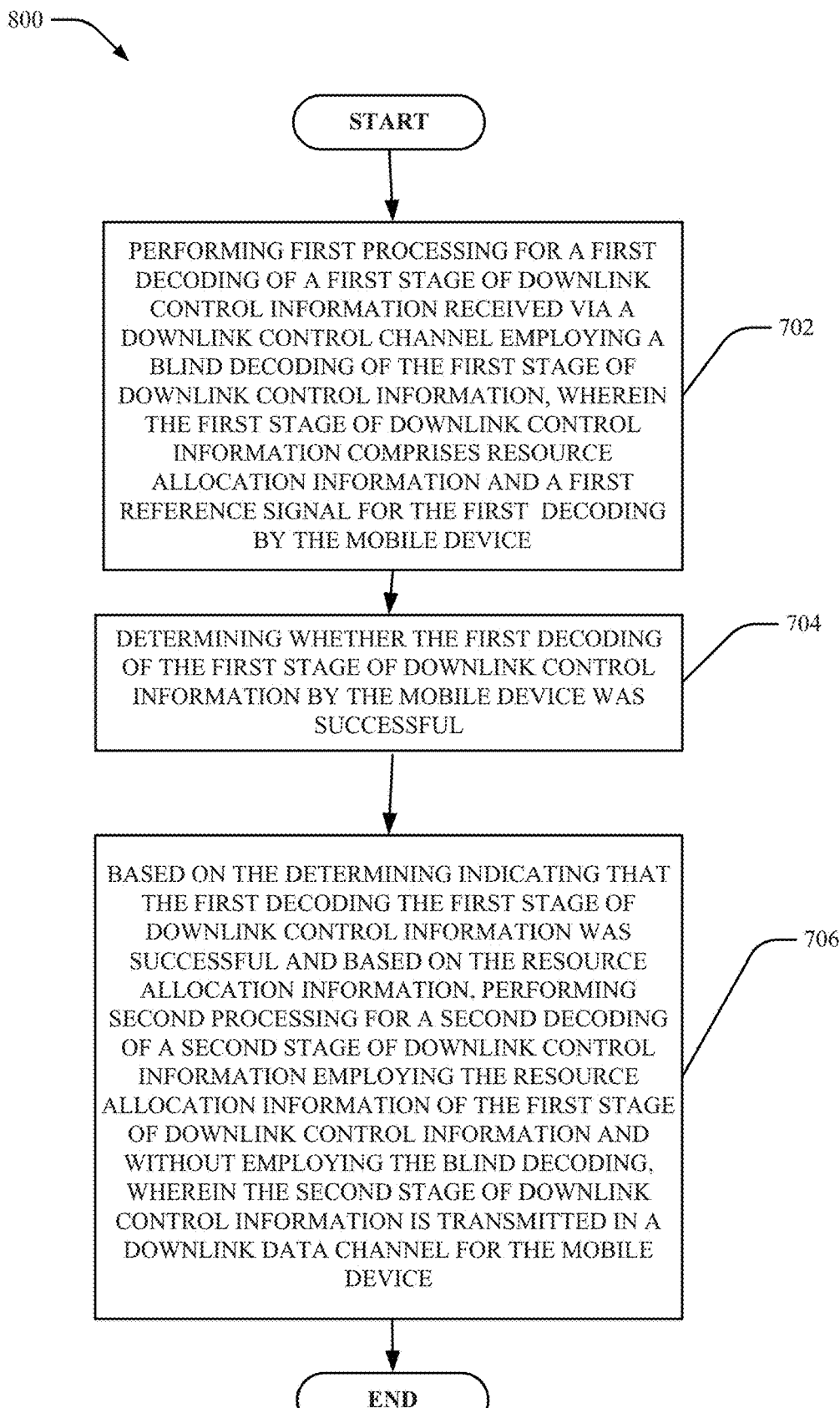
FIGS. 7, 8 and 9 illustrate flowcharts of methods that facilitate an enhanced two-stage downlink control channel in accordance with one or more embodiments described herein.
Figure 8:
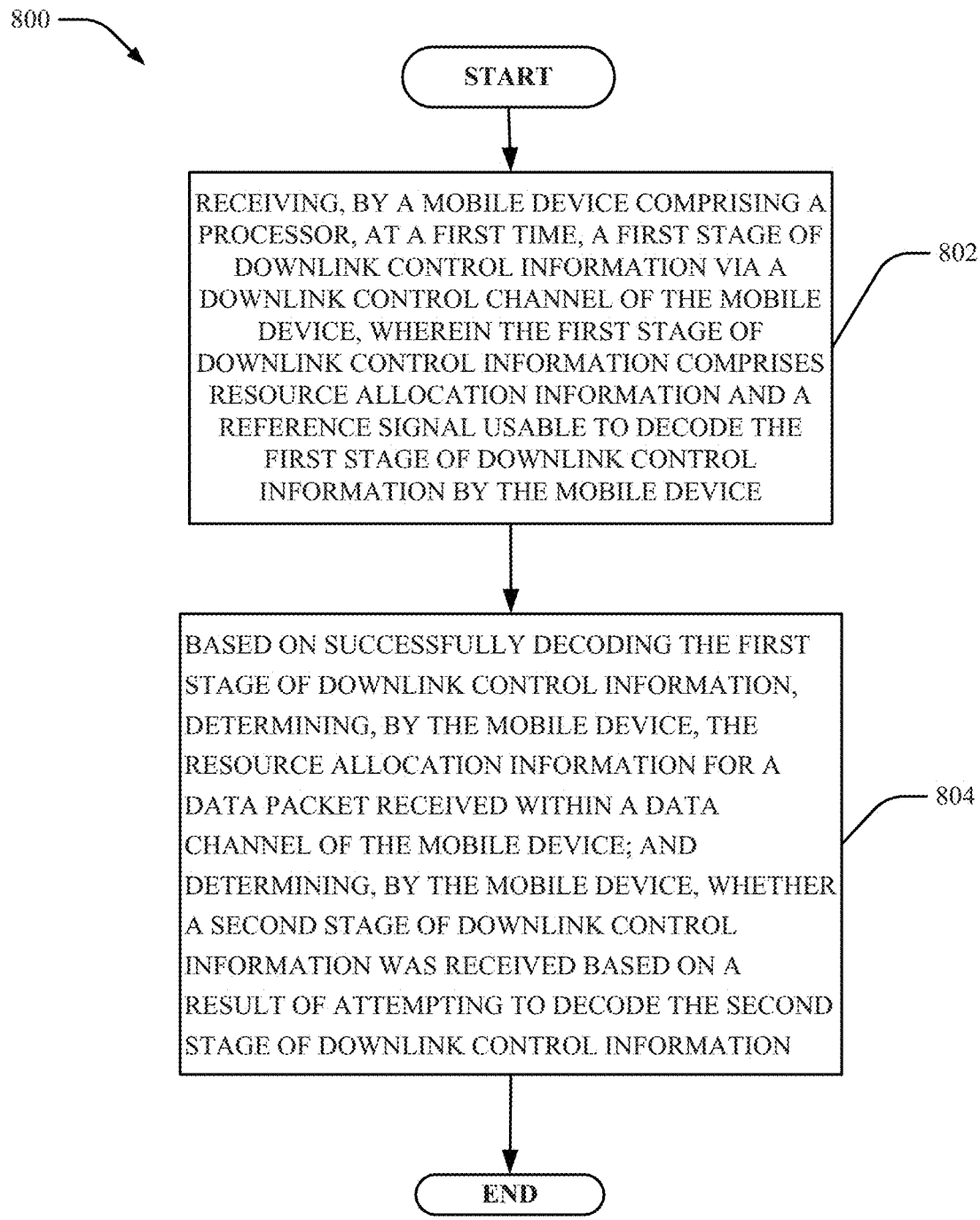
Figure 9:
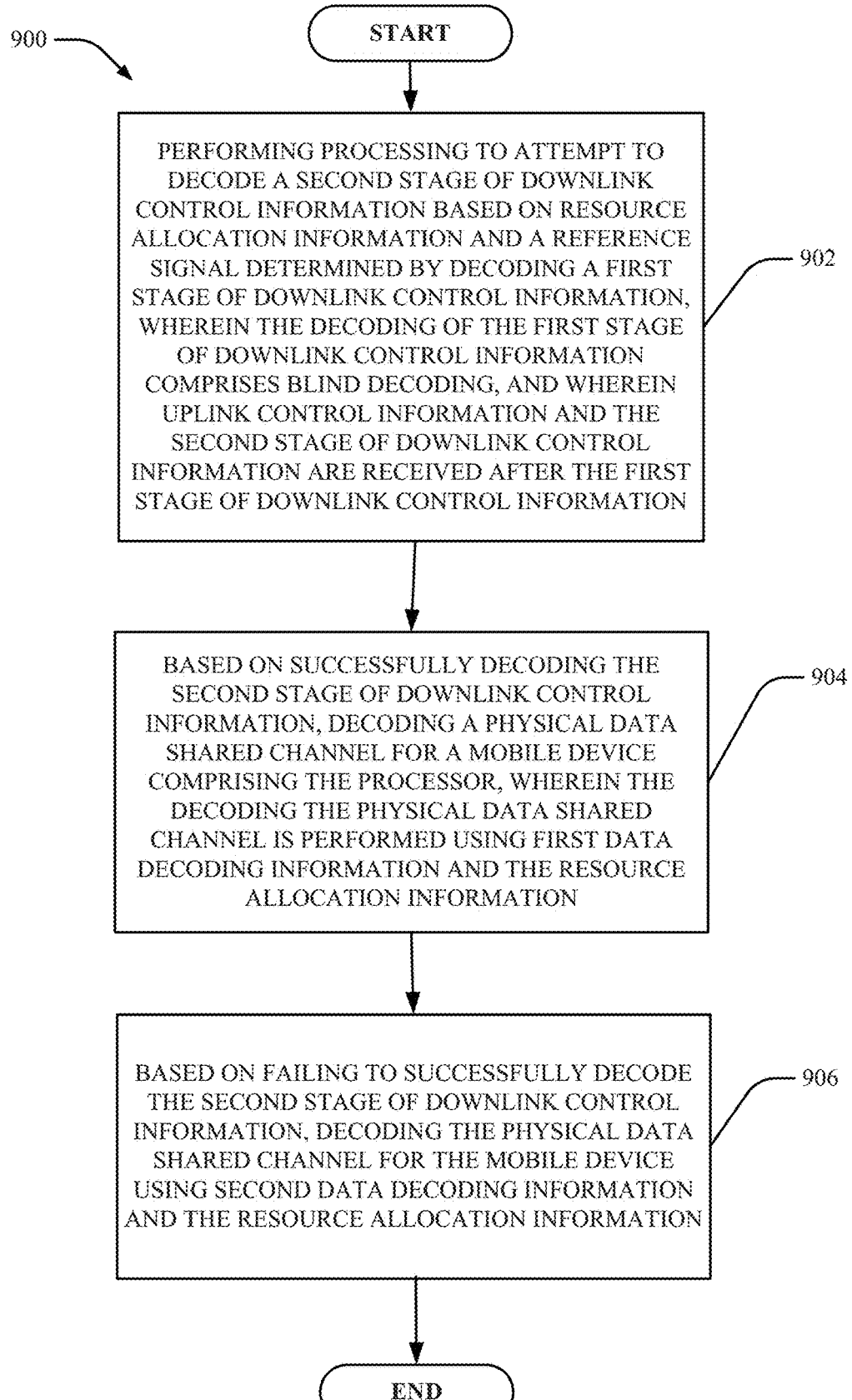

FIGS. 7, 8 and 9 illustrate flowcharts of methods that facilitate an enhanced two-stage downlink control channel in accordance with one or more embodiments described herein. Turning first to FIG. 7, at 702, method 700 can comprise performing first processing for a first decoding of a first stage of downlink control information received via a downlink control channel employing a blind decoding of the first stage of downlink control information, wherein the first stage of downlink control information comprises resource allocation information. At 704, method 700 can comprise determining whether the first decoding of the first stage of downlink control information by the mobile device was successful.

At 706, method 700 can comprise based on the determining indicating that the first decoding the first stage of downlink control information was successful and based on the resource allocation information from decoded first stage of downlink control information, performing second processing for a second decoding of a second stage of downlink control information employing the resource allocation information of the first stage of downlink control information and without employing the blind decoding, wherein the second stage of downlink control information is transmitted in a downlink data channel for the mobile device.

In some embodiments, the second stage downlink control information is received via the downlink data channel, and the second reference signal for the mobile device is associated with the second stage of downlink control information and the second stage of uplink control information.

In some embodiments, although not shown, method 700 can also comprise: based on the determining indicating that the first decoding of the first stage of downlink control information failed to be successful, determining whether a defined scheduling is indicated for the first stage of downlink control information. Based on the defined scheduling being determined to be indicated for the first stage of downlink control information, the method 700 can comprise performing the second processing for the second decoding of the second stage downlink control information employing a previously received first stage of downlink control information received prior to the first stage of downlink control information. Although not shown, method 700 can then comprise based on the defined scheduling being determined not to be indicated for the first stage of downlink control information, evaluating a next transmission time interval to decode the first stage of downlink control information, wherein the next transmission time interval is a transmission time interval after a time interval during which the defined scheduling is determined to be indicated for the first stage of downlink control information.

In some embodiments, although not shown, method 700 can comprise: determining whether the second decoding of the second stage of downlink control information was successful; and based on the second decoding of the second stage of downlink control information being determined not to be successful: utilizing first decoding information in the second stage downlink control information for a third decoding of data within the downlink data channel; and generating a request for retransmission of the second stage of downlink control information. In some embodiments, method 700 can also comprise based on the second decoding of the second stage of downlink control information being determined to be successful, performing third processing for a third decoding of the data within the downlink data channel employing second decoding information in the second stage of downlink control information, wherein the first decoding information was obtained by the mobile device prior to receipt of the second decoding information.

In some embodiments, the mobile device 104 can also comprise a timer that determines a duration of time that indicates a time since receipt of the second stage of downlink control information. The method 700 operations can further comprise: determining whether the second decoding of the second stage of downlink control information was successful; based on the second decoding of the second stage of downlink control information being determined not to be successful: utilizing a previously received second stage of downlink control information for a third decoding of data within the downlink data channel received prior to the second stage of downlink control information, and transmitting a request to resend the second stage of downlink control information for which the determination was made that the second stage of downlink control information was not successfully decoded, wherein the transmitting is performed based on an expiration of the timer.

In some embodiments, method 700 can also comprise performing third processing for a third decoding of a second stage of uplink control information, wherein the second stage of uplink control information is received via the downlink data channel, and wherein the downlink data channel comprises a second reference signal for the mobile device.

Turning now to FIG. 8, at 802, method 800 can comprise receiving, by a mobile device comprising a processor, at a first time, a first stage of downlink control information via a downlink control channel of the mobile device, wherein the first stage of downlink control information comprises resource allocation information and a reference signal usable to decode the first stage of downlink control information by the mobile device.

In some embodiments, the resource allocation information comprises physical resource block information indicating a physical resource block assigned to the mobile device. The resource allocation information can comprise time domain information indicating a number of slots assigned to the mobile device.

In some embodiments, SPS for the first stage downlink control information is determined to be applicable based on failing to successfully decode the first stage of downlink control information.

At 804, method 800 can comprise based on successfully decoding the first stage of downlink control information: determining, by the mobile device, the resource allocation information for a data packet received within a data channel of the mobile device; and determining, by the mobile device, whether a second stage of downlink control information was received based on a result of attempting to decode the second stage of downlink control information. In some embodiments, the successfully decoding the first stage of downlink control information comprises blind decoding a search space within the downlink control channel.

Although not shown, in some embodiments, method 800 can comprise: determining, by the mobile device, that the second stage of downlink control information has been received; and decoding, by the mobile device, the second stage of downlink control information based on the resource allocation information and the reference signal for the first stage of downlink control information, wherein the first stage of downlink control information is decoded employing blind decoding and wherein the second stage of downlink control information is decoded based on knowledge of a location of the second stage of downlink control information within the downlink data channel.

Although not shown, in some embodiments, the method 800 can comprise determining, by the mobile device, the decoding information of the second stage of downlink control information, wherein the decoding information comprises modulation and coding scheme information and multiple input multiple output information for the data packet.

Although not shown, in some embodiments, the method 800 can comprise determining, by the device, that the second stage of downlink control information has failed to be received in a first transmission time interval; and employing, by the device, decoding information from decoding information receiving in a second transmission time interval to decode data received in the first transmission time interval based on the determining that the second stage of downlink control information has failed to be received, wherein the second transmission time interval is prior to the first transmission time interval.

Although not shown, in some embodiments, the method 800 can comprise requesting, by the mobile device, a retransmission of the second stage of downlink control information based on the determining that the second stage of downlink control information has failed to be received in the first transmission time interval. In some embodiments, method 800 can also comprise requesting, by the mobile device, a retransmission of the second stage of downlink control information based on the determining that the second stage of downlink control information has failed to be received in the first transmission time interval and expiration of a time period during which the second stage of downlink control information was not received yet was sent in the first transmission time interval.

Turning now to FIG. 9, at 902, method 900 can comprise performing processing to attempt to decode a second stage of downlink control information based on resource allocation information and a reference signal determined by decoding a first stage of downlink control information, wherein the decoding of the first stage of downlink control information comprises blind decoding, and wherein uplink control information and the second stage of downlink control information are received after the first stage of downlink control information. At 904, method 900 can comprise based on successfully decoding the second stage of downlink control information, decoding a physical data shared channel for a mobile device comprising the processor, wherein the decoding the physical data shared channel is performed using first data decoding information and the resource allocation information.

At 906, method 900 can comprise based on failing to successfully decode the second stage of downlink control information, decoding the physical data shared channel for the mobile device using second data decoding information and the resource allocation information.

In some embodiments, the first data decoding information comprises first parameters from the second stage of downlink control information and the resource allocation information. In some embodiments, the first parameters comprise modulation and coding scheme information, multiple input multiple output information and hybrid automatic repeat request information from the second stage of downlink control information.

In some embodiments, the second data decoding information comprises second parameters from the second stage of downlink control information and the resource allocation information, and wherein the second parameters comprise modulation and coding scheme information and multiple input multiple output information from a previously received second stage of downlink control information received prior to the second stage of downlink control information.

Figure 10:
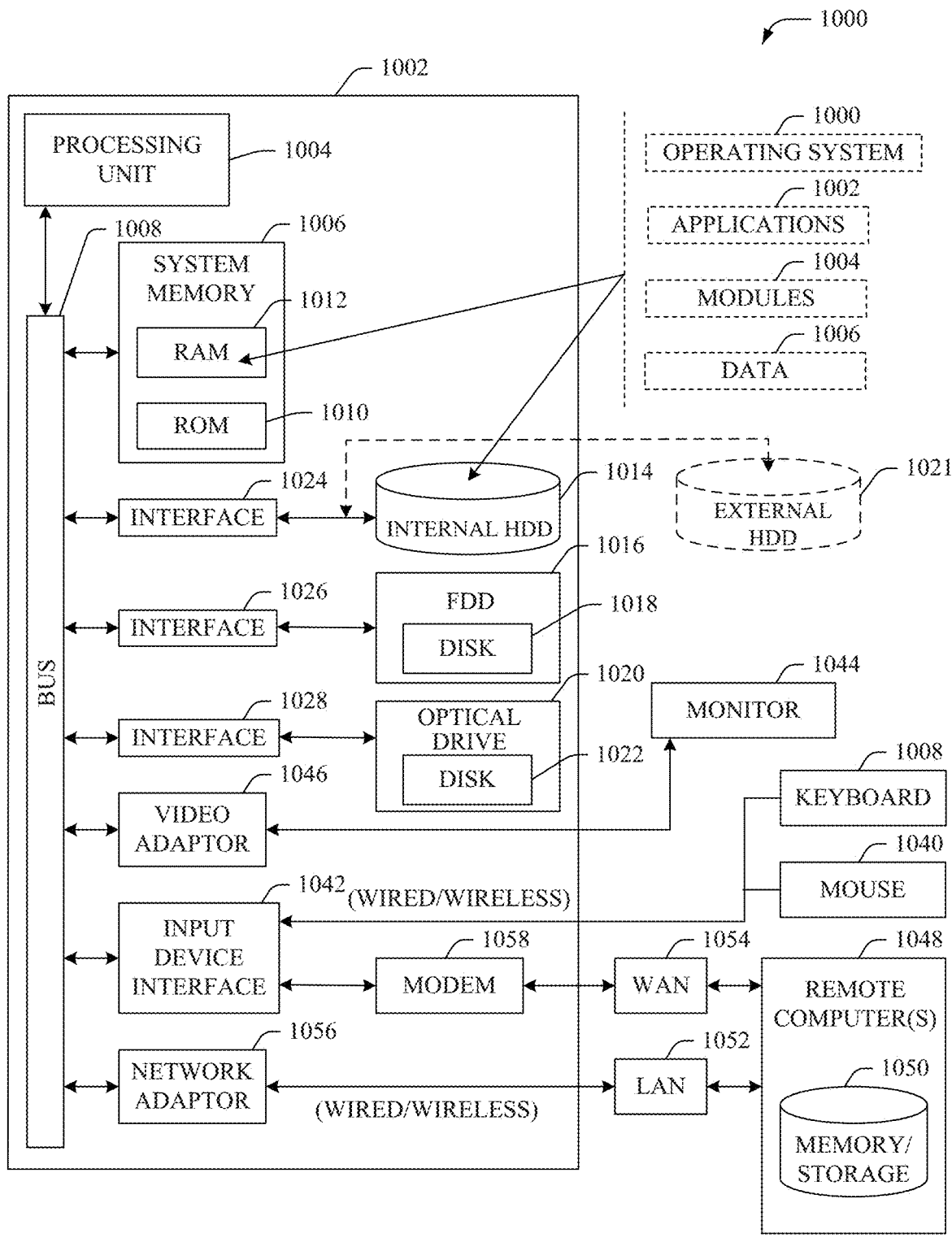
FIG. 10 illustrates a block diagram of a computer that can be employed in accordance with one or more embodiments described herein.

FIG. 10 illustrates a block diagram of a computer that can be employed in accordance with one or more embodiments. Repetitive description of like elements employed in other embodiments described herein is omitted for sake of brevity. In some embodiments, the computer, or a component of the computer, can be or be comprised within any number of components described herein comprising, but not limited to, base station device 102 or mobile device 104 (or a component of base station device 102 or mobile device 104).

In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment 1000 for implementing various embodiments of the embodiments described herein comprises a computer 1002, the computer 1002 comprising a processing unit 1004, a system memory 1006 and a system bus 1008. The system bus 1008 couples system components comprising, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1010 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An apparatus, comprising:
    a processor; and
    a memory that stores executable instructions that, when executed by the processor, facilitate performance of operations, comprising:
        performing first processing for a first decoding of a first stage of downlink control information;
        performing second processing for a second decoding of a second stage of downlink control information employing resource allocation information of the first stage of downlink control information and without employing blind decoding;
        based on the second decoding of the second stage of downlink control information being determined to be successful, performing third processing for a third decoding of a physical data shared channel; and
        based on the second decoding of the second stage of downlink control information being determined not to be successful, performing fourth processing for a fourth decoding of the physical data shared channel using decoding information and the resource allocation information.

2. The apparatus of claim 1, further comprising:
    determining whether a defined scheduling is indicated for the first stage of downlink control information; and
    based on the defined scheduling being determined to be indicated for the first stage of downlink control information, performing the second processing for the second decoding of the second stage of downlink control information employing a previously received first stage of downlink control information.

3. The apparatus of claim 2, further comprising:
    based on the defined scheduling being determined not to be indicated for the first stage of downlink control information, evaluating a next transmission time interval to decode the first stage of downlink control information, wherein the next transmission time interval is a transmission time interval after a time interval during which the defined scheduling is determined to be indicated for the first stage of downlink control information.

4. The apparatus of claim 1, further comprising a timer that determines a duration of time that indicates a time since receipt of the second stage of downlink control information, and wherein the operations further comprise:
    based on the second decoding of the second stage of downlink control information being determined not to be successful, transmitting a request to resend the second stage of downlink control information for which a determination was made that the second stage of downlink control information was not successfully decoded, wherein the transmitting is performed based on an expiration of the timer.

5. The apparatus of claim 1, wherein the operations further comprise:
    performing fifth processing for a fifth decoding of a stage of uplink control information, wherein the stage of uplink control information is received via a downlink data channel, and wherein the downlink data channel comprises a reference signal for a mobile device.

6. The apparatus of claim 5, wherein the second stage of downlink control information is received via the downlink data channel, and wherein the reference signal for the mobile device is associated with the second stage of downlink control information and the stage of uplink control information.

7. A method, comprising:
    performing, by a device comprising a processor, first processing for a first decoding of a first stage of downlink control information;
    performing, by the device, second processing for a second decoding of a second stage of downlink control information employing resource allocation information associated with the first stage of downlink control information and without employing blind decoding;
    based on the second decoding of the second stage of downlink control information being determined to be successful, performing, by the device, third processing for a third decoding of a physical data shared channel; and
    based on the second decoding of the second stage of downlink control information being determined not to be successful, performing, by the device, fourth processing for a fourth decoding of the physical data shared channel using decoding information and the resource allocation information.

8. The method of claim 7, further comprising:
    determining, by the device, whether a defined scheduling is indicated for the first stage of downlink control information; and
    based on the defined scheduling being determined to be indicated for the first stage of downlink control information, performing, by the device, the second processing for the second decoding of the second stage of downlink control information employing a previously received first stage of downlink control information.

9. The method of claim 8, further comprising:
    based on the defined scheduling being determined not to be indicated for the first stage of downlink control information, evaluating, by the device, a next transmission time interval to decode the first stage of downlink control information, wherein the next transmission time interval is a transmission time interval after a time interval during which the defined scheduling is determined to be indicated for the first stage of downlink control information.

10. The method of claim 7, further comprising:
determining, by the device, a duration of time that indicates a time since receipt of the second stage of downlink control information; and
based on the second decoding of the second stage of downlink control information being determined not to be successful, transmitting, by the device, a request to resend the second stage of downlink control information for which a determination was made that the second stage of downlink control information was not successfully decoded, wherein the transmitting is performed based on an expiration of a timer.

11. The method of claim 7, further comprising:
performing, by the device, fifth processing for a fifth decoding of a stage of uplink control information, wherein the stage of uplink control information is received via a downlink data channel, and wherein the downlink data channel comprises a reference signal for a mobile device.

12. The method of claim 11, wherein the second stage of downlink control information is received via a downlink data channel, and wherein the reference signal for a mobile device is associated with the second stage of downlink control information and the stage of uplink control information.

13. A non-transitory machine-readable medium, comprising executable instructions that, when executed by a processor, facilitate performance of operations, comprising:
performing first processing for a first decoding of a first stage of downlink control information;
performing second processing for a second decoding of a second stage of downlink control information employing resource allocation information of the first stage of downlink control information and without employing blind decoding;
based on the second decoding of the second stage of downlink control information being determined to be successful, performing third processing for a third decoding of a physical data shared channel; and
based on the second decoding of the second stage of downlink control information being determined not to be successful, performing fourth processing for a fourth decoding of the physical data shared channel using decoding information and the resource allocation information.

14. The non-transitory machine-readable medium of claim 13, wherein the operations further comprise:
determining whether a defined scheduling is indicated for the first stage of downlink control information; and
based on the defined scheduling being determined to be indicated for the first stage of downlink control information, performing the second processing for the second decoding of the second stage of downlink control information employing a previously received first stage of downlink control information.

15. The non-transitory machine-readable medium of claim 14, wherein the operations further comprise:
based on the defined scheduling being determined not to be indicated for the first stage of downlink control information, evaluating a next transmission time interval to decode the first stage of downlink control information, wherein the next transmission time interval is a transmission time interval after a time interval during which the defined scheduling is determined to be indicated for the first stage of downlink control information.

16. The non-transitory machine-readable medium of claim 13, wherein the operations further comprise:
determination of a duration of time that indicates a time since receipt of the second stage of downlink control information; and
based on the second decoding of the second stage of downlink control information being determined not to be successful,
transmitting a request to resend the second stage of downlink control information for which the determination was made that the second stage of downlink control information was not successfully decoded, wherein the transmitting is performed based on an expiration of the duration of time.

17. The non-transitory machine-readable medium of claim 13, wherein the operations further comprise:
performing fifth processing for a fifth decoding of a stage of uplink control information, wherein the stage of uplink control information is received via a downlink data channel, and wherein the downlink data channel comprises a reference signal for a mobile device.

18. The non-transitory machine-readable medium of claim 17, wherein the second stage of downlink control information is received via the downlink data channel.

19. The non-transitory machine-readable medium of claim 17, wherein the reference signal for the mobile device is associated with the second stage of downlink control information.

20. The non-transitory machine-readable medium of claim 19, wherein the reference signal is further associated with the stage of uplink control information.

* * * * *